United States Patent [19]

Hara et al.

[11] Patent Number: 5,648,182
[45] Date of Patent: Jul. 15, 1997

[54] FUEL CELL POWER GENERATION SYSTEM

[75] Inventors: Takeshi Hara; Kenji Kato, both of Aichi-ken; Noriyuki Takada, Hokkai-do, all of Japan

[73] Assignees: Kabushikikaisha Eqous Research; Aisin AW Co., Ltd., both of Japan

[21] Appl. No.: 454,662

[22] Filed: May 31, 1995

[30] Foreign Application Priority Data

Aug. 31, 1994 [JP] Japan .................................. 6-232047

[51] Int. Cl.6 ........................... H01M 8/18; H01M 2/00
[52] U.S. Cl. .................................. 429/20; 429/34
[58] Field of Search ........................ 429/12, 17, 19, 429/20, 34

[56] References Cited

U.S. PATENT DOCUMENTS 4,309,359  1/1982  Pinto ............................ 429/17 X
4,537,839  8/1985  Cameron ....................... 429/34 X
5,419,978  5/1995  Landau ......................... 429/17 X Primary Examiner—Donald R. Valentine
Attorney, Agent, or Firm—Lorusso & Loud

[57] ABSTRACT

A fuel cell power generation system suitable for powering an electric vehicle and which provides high degree of safety when restarting power generation. The system is small in size, light in weight and low in cost of power generation. Three-way valves are provided in an exhaust-passage extending from a fuel-reforming unit and in pipes connecting the fuel-reforming unit, a CO removal unit and a fuel cell and as a gas exhaust valve on an anode side exhaust passage extending from the fuel cell. Accordingly, upon shut down, after exhausting residual reformed gas, combustion exhaust gas from a combustion unit associated with the fuel reforming unit is passed through the respective units for purging the residual reformed gas.

12 Claims, 5 Drawing Sheets

FUEL CELL POWER GENERATION SYSTEM

BACKGROUND OF THE INVENTION

1. Field of the Invention

This invention relates to a fuel cell power generation system for generating electric power by using a hydrogen-rich reformed gas as fuel, to a method for operating same and, more particularly, to a method of operation when power generation is suspended.

2. Description of the Related Art

A fuel cell power generation system including a hydrogen-air fuel cell and a fuel gas generating apparatus (i.e., steam reformer+shifter) generally contains residual reformed gas ($H_2$-rich reformed gas) in the fuel cell and steam reformer after stopping feed of the $H_2$-rich reformed gas and air into the fuel cell upon suspending power generation. If the fuel cell, the associated apparatus or/and reformed gas connections leak reformed gas, the residual reformed gas will create a danger of explosion when mixed with air supplied anew in resuming operation of the system.

Further, if the above-mentioned residual reformed gas is allowed to remain the fuel-generating apparatus, the reforming catalyst therein will deteriorate because of carbon deposition by catalytic reforming at a low temperature. The fuel cell would also suffer a deleterious effect because its battery electric potential would not be lowered due to the presence of the above-mentioned residual reformed gas.

Japanese Kokai No. Hei 4-51469 discloses that, conventionally, after interrupting feed of air and reformed gas with suspension of fuel cell power generation, safety upon resuming operation of the system and satisfactory performance of the fuel-generating apparatus and the fuel cell can be achieved by forcibly purging the residual reformed gas with an external supply of inert gas such as nitrogen. However, the prior art approach utilizing inert gas requires a gas supply such as a nitrogen gas cylinder, which increase the size of the overall system and requires maintenance to exchange the consumed cylinder with a new one, so that such an approach is not suitable for a fuel cell power generation system mounted in, for example, an electric vehicle. Another disadvantage is the increase in cost of power generation due to the expense of the inert gas.

SUMMARY OF THE INVENTION

Accordingly, an object of the present invention is to provide a fuel cell power generation system suitable for mounting, for example, on an electric vehicle and a method of operating same so as to solve the above-mentioned disadvantages.

More specifically, it is an object of the present invention to provide a level of safety when resuming power generation.

Another object of the present invention is to provide such a system which is small in size, light in weight and low in cost of power generation.

To achieve the above-mentioned objects, the fuel cell power generation system according to the present invention is provided with a gas purging means (valves V1–V3, V11–V14 and V21) to displace the reformed gas, remaining in at least one of the fuel-generating apparatus (1), the CO remover (2) and the fuel cell (5), with the combustion exhaust gas flowing from the combustion apparatus (6) in the fuel-generating apparatus (1) in an operation for suspending the system.

In the operation of the fuel cell power generation system according to the present invention, after exhausting the reformed gas from the fuel-generating apparatus (1), the CO remover (2) and the fuel cell (5), the combustion exhaust gas exhausted from the fuel-generating apparatus (1) is routed through the reforming fuel feed passage (19) and/or thorough the reformed gas feeding pipes (21–23) connecting the fuel-processing apparatus (1), the CO remover (2) and the fuel cell (5) to the fuel gas generating apparatus (1), the CO remover (2) and the fuel cell (5).

In operation of the fuel cell power generation system having the above-described gas purging means, the residual reformed gas is replaced by the combustion exhaust gas drawn from the combustion chamber in the fuel-generating apparatus, in connection with suspension of power generation, so use of inert gas is not required. Consequently, the fuel cell power generation system may be small-sized and low in weight.

DETAILED DESCRIPTION OF THE PREFERRED EMBODIMENT(S)

Figure 1:
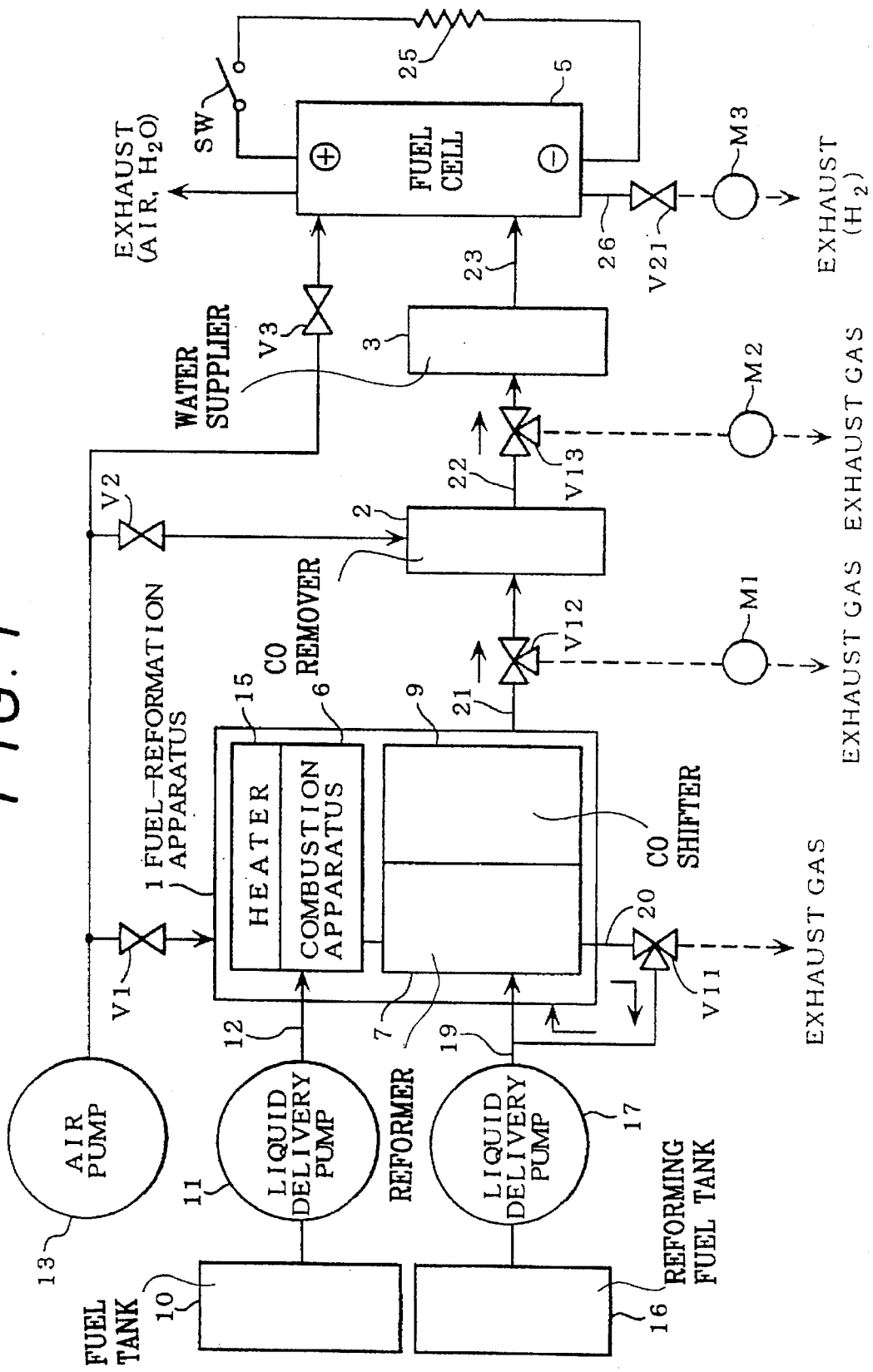
FIG. 1 is a block diagram of a first embodiment of a fuel cell power generation system in accordance with this present invention.

In the description which follows the words "up", "down", "right" and "left" are used to designate directions relating to the drawing to which reference is made. The words "in" and "out" will refer to directions toward and away from, respectively, the geometric center of the device and designated parts thereof. Such terminology will include derivatives and words of similar import.

As shown in FIG. 1, the fuel cell power generation system of the first embodiment includes a fuel-generating apparatus 1, CO remover 2, water supplier 3 and fuel cell 5. Each of these system elements will be described in turn below.

Fuel Gas Generating Apparatus

The fuel gas generator 1 includes a combustion apparatus 6 in combination with a reformer 7 and a CO shifter 9. In the combustion apparatus 6, fuel, for example liquid methanol, is introduced from a fuel tank 10 through a fuel feed-passage 12 using a liquid delivery pump 11. Combustion air is delivered by an air pump 13 through an electromagnetic switch valve V1. Alternatively, the liquid methanol from the fuel tank 10 may be burned by contact with a catalyst for combustion. In the case of using a combustion catalyst, the necessary heating to a certain temperature for activating the catalyst can be carried out by a heater 15. Combustion exhaust gas from the combustion apparatus 6 is used as a heat source for the reformer 7 and CO shifter 9.

The reformer 7 receives a fuel/water mixture (for example, in the proportion of liquid methanol to water of 1:1.2) from a reforming fuel tank 16 through a reforming fuel feed passage by means of a liquid delivery pump 17. The fuel mixture feed is gasified in the reformer 7 at a temperature of 110°–150° C. by utilizing the combustion exhaust gas from the combustion apparatus 6. The fuel mixture feed undergoes a reaction in contact with a reforming catalyst (for example, composed of Cu/Zu) to generate a hydrogen-rich reformed gas. The reformation reaction should be carried out at a temperature of 200°–300° C., and more preferably 250°–300° C. The reformed gas thus produced contains $CO_2$ and a small amount of CO, in addition to hydrogen. Incidentally, the concentration of carbon monoxide should be less than 100 ppm to avoid poisoning of the catalyst (Pt) on the electrode of the fuel cell 5 which utilizes the hydrogen as a fuel.

In the CO shifter 9, the concentration of CO in the foregoing reformed gas is lowered to less than about 100 ppm generally by a 2-step process taking advantage of a CO shifting reaction using a shift catalyst. The recommended operating temperature of the CO shifter is 150°–200° C., the heat for which is obtained from the combustion exhaust gas from combustion apparatus 6. The combustion exhaust gas from the combustion apparatus 6, after being employed in the reformer 7 and the CO shifter 9, exits through exhaust-passage 20 while the power generation system is running.

CO Remover

The CO remover 2 oxidizes the CO in the reformed gas exiting the CO shifter 9 of fuel gas generating apparatus 1 through passage 21, to form $CO_2$ using a selective oxidation catalyst. The selective oxidation catalyst is a catalyst functioning to selectively oxidize the CO while avoiding oxidation of hydrogen to water at a controlled temperature. $Au/\alpha\text{-}Fe_2O_3/\gamma\text{-}Al_2O_3$ is used as the CO selective-oxidizing catalyst.

The temperature range for operation with selective-oxidizing catalyst ranges from room temperature up to 100° C. The oxidation reaction utilizes the air delivered through the electromagnetic switch valve V2 from the air pump 13.

The reformed gas from the fuel gas generating apparatus 1 is passed through the CO 5 remover 2 in order to further lower the concentration of CO in the reformed gas to less than 100 ppm to render it suitable for use in the fuel cell 5.

Water Supplier

Assuming that the fuel cell 5 is a polymer electrolyte type, the working temperature thereof should be 50°–100° C. and water must be constantly added to the electrolyte. In the water supplier 3, the reformed gas sent through the reformed gas feeding channel 22 from the CO remover 2 is humidified and cooled. The water supplier 3 further includes a thermostatic vessel and heater (neither is shown). The reformed gas, cooled and humidified in the water supplier 3, is supplied through the reformed gas feed channel 22 to the anode side of fuel cell 5.

Fuel Cell

The fuel cell 5 generates power by reaction between the reformed gas fed to the anode side and air fed to the cathode side from the air pump 13 through an electromagnetic switch valve V3. The thus generated electric power passes through a switch SW to a load 25 such as the drive motor of an electric vehicle.

Purge System

The fuel cell power generation system of the present invention further includes purge means for displacing the reformed gas remaining in one more of the fuel gas generating apparatus 1, CO remover 2 and fuel cell 5, with combustion exhaust gas from the combustion apparatus 6, when operation of the system is suspended.

The purge means of the first embodiment includes gas changeover valves V11, V12, V13, each of which is a three-way electromagnetic valve, respectively located in the exhaust-passage 20 extending from the fuel gas generating apparatus 1, in the reformed gas feeding channel 21 between the fuel gas generating apparatus 1 and the CO remover 2, and in the reformed gas feeding channel 22 between the CO remover 2 and the water supplier 3. The purge means further includes a gas exhaust valve V21, which is also a two-way electromagnetic valve, located in the anode side exhaust-passage 26 extending from the fuel cell 5.

The gas changeover valve V11, in the exhaust-passage 20 leading from the foregoing fuel processing apparatus 1, can switch to route the stream of the combustion exhaust gas exhausted from the fuel gas generating apparatus 1 back into the reformation fuel feed passage 19 at the upstream side of fuel gas generating apparatus 1. The gas changeover valves V12, V13 in reformed gas feeding channels 21, 22 are used to exhaust and purge the reformed gas from the fuel-processing apparatus 1 and CO remover 2.

Figure 2:
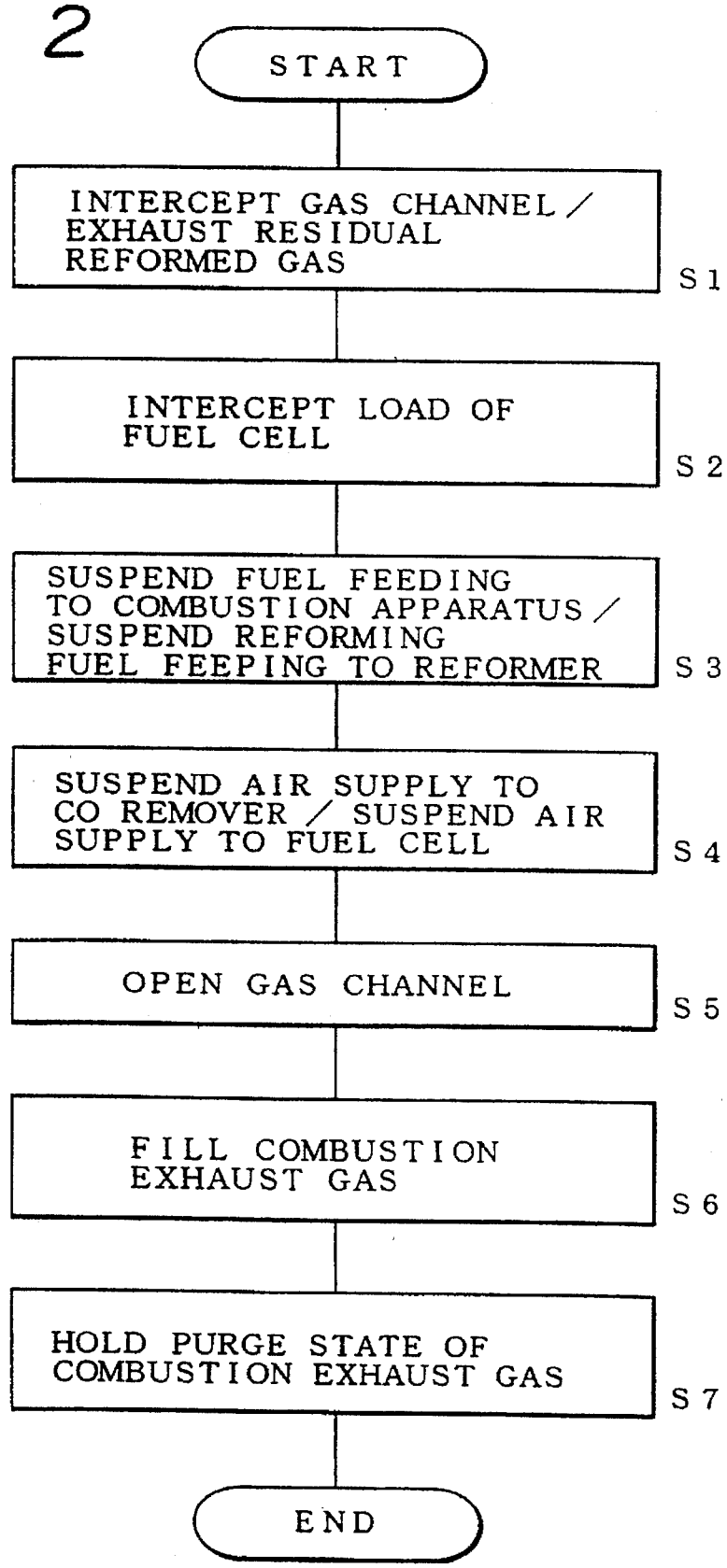
FIG. 2 is a flowchart of the operating routine utilized upon suspension of power generation in the first embodiment of FIG. 1.

FIG. 2 illustrates the process control routine for operation of the power generation system of the invention. Process control is provided automatically by means of a computer (not shown).

In step S1, the gas changeover valves V12, V13, respectively located in reformed gas feeding channels 21, 22, are switched to close the channels 21 and 22 to thereby exhaust the residual reformed gas from the fuel gas generating apparatus 1 and the CO remover 2. In this step S1, the flow rate of the residual reformed gas exhausted through respective gas changeover valves V12, V13 is monitored with respective flowmeters M1, M2 of a heat transmission correspondence type.

The residual reformed gas in the fuel cell 5 is exhausted from the anode side exhaust passage 26, through the gas exhaust valve V21. The flow rate of this latter exhausted residual reformed gas is monitored with a flowmeter M3. However, it should be noted that the reformed gas is constantly exhausted through the anode side exhaust passage 26 of the fuel cell 5 even in the normal power generation operating state of the system.

Next, the switch SW is cut to interrupt feed of power to the load 22 from the fuel cell 5 (step S2).

The two liquid delivery pumps 11, 17 are also turned off to stop the feed of fuel to the combustion apparatus 6 and to the reformer 7 (step S3).

The electromagnetic switch valve V2 is closed to stop the feed of air from the air pump 13 to the CO remover 2 and the electromagnetic switch valve V3 is closed to stop the air feed from the air pump 13 to the fuel cell 5 (step S4).

When exhaust of the residual reformed gas from the fuel gas generating apparatus 1, CO remover 2 and fuel cell 5 is no longer recognized by the respective flowmeters M1, M2, M3, the gas changeover valves V12, V13, respectively located in reformed gas feeding channels 21, 22, are switched to open the reformed gas feeding channels 21, 22 (step S5).

The gas changeover valve V11 provided in the exhaust passage 20 from the fuel-reformer 7 is switched to route the combustion exhaust gas exhausted from the fuel gas generating apparatus 1 back into the reforming fuel feed passage 19 at the upstream side of the fuel gas generating apparatus 1. Accordingly, the combustion exhaust gas fills the reformer 7 and the CO shifter 9 of the fuel gas generating apparatus 1 and the reformed gas feed channel 21, CO remover 2, reformed gas feed channel 22, water supplier 3, reformed gas feeding channel 23 and the inside of fuel cell 5, in this order (step S6).

The combustion exhaust gas entering the fuel cell 5 is cooled in passage through the water supplier 3, so that the inside temperature of fuel cell 5 will never rise higher than the temperature at which the system runs and, therefore, it is unnecessary to provide a heat exchanger to cool the combustion exhaust gas.

The combustion exhaust gas is held within the system by closing the gas changeover valves V12, V13 of respective reformed gas feeding channels 21, 22 and the gas exhaust valve V21 of the anode side exhaust passage 26 extending from fuel cell 5.

In the above-described system, the reformed gas remaining in respective apparatus 1, 2, 3, 5 and their connecting gas feeding channels 21, 22, 23, upon discontinuing power generation, is replaced with the combustion exhaust gas fed from the combustion apparatus 6 of the fuel-generating apparatus 1. Consequently, when power generation is resumed, the residual reformed gas does not create the peril of an extraordinary reaction when mixed with the air supplied anew. Further, the reforming catalyst in the fuel-processing apparatus 1 and the fuel cell catalyst are not degraded by the residual reformed gas.

Since utilization of the combustion exhaust gas from the combustion apparatus 6 does not require a source of inert gas, as is conventionally used, the fuel cell power generation system may be small in size and low in weight, thus reducing maintenance time and cost of power generation.

In the conventional system using inert gas as a purge, the reformer was not allowed to receive the inert gas before being cooled to less than 100° C. because the reformer, which is operated at a high temperature of 250°–300° C., tends to cause thermal strain in structures such as piping upon being filled with the inert gas at a lower temperature than the above-mentioned operating temperature. The system according to the present invention, however, never requires cooling of the reformer because the same combustion exhaust gas utilized for heating the reformer during operation is used as a purge. Accordingly, operation of the system can be safely suspended and maintained in that same state by smoothly replacing the residual reformed gas with the combustion exhaust gas.

Figure 3:
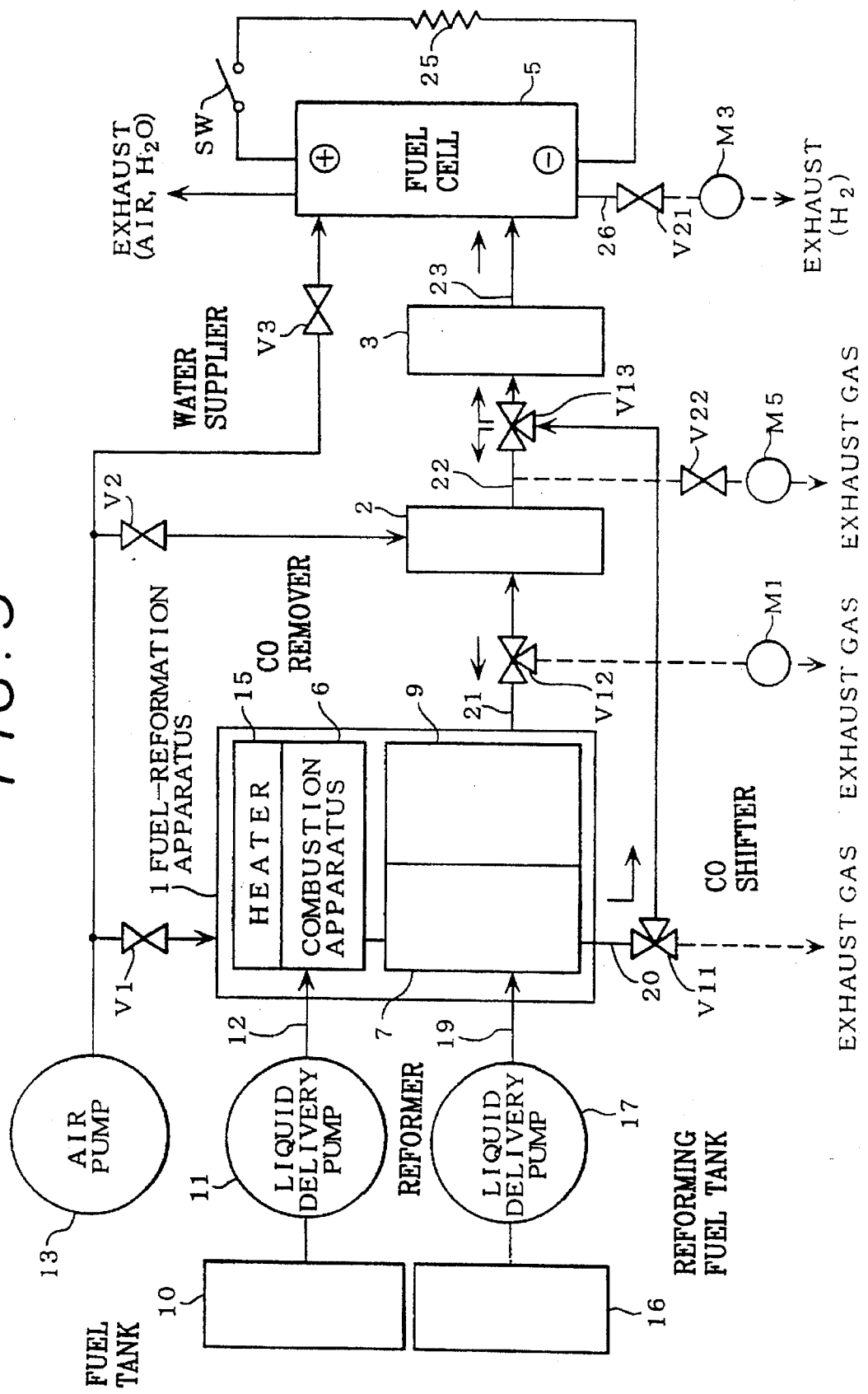
FIG. 3 is a block diagram of a second embodiment of the fuel cell power generation system of the present invention.

As shown in FIG. 3, a second embodiment of the invention differs from the first embodiment in that a gas exhaust valve V22 and flowmeter M5 are provided in the reformed gas feeding channel 22 connecting the CO remover 2 and the water supplier 3. Accordingly, after exhausting the residual reformed gas through the gas changeover valve V12 and two of the gas exhaust valves V21, V22 in the shut down operation, the combustion exhaust gas from the fuel gas generating apparatus 1 flows through the gas changeover valve V11 in the exhaust-passage 20 and thereafter through the gas changeover valve V13 and into the reformed gas feeding channel 22 between the CO remover 2 and water supplier 3. Consequently, the combustion exhaust gas flows through the reformed gas feeding channel 22 between the CO remover 2 and water supplier 3 into the upstream side of the CO remover 2, reformed gas feeding channel 21 and fuel gas generating apparatus 1, in this order, and into the downstream side of the water supplier 3, reformed gas feeding channel 23 and the inside of the fuel cell 5, to thereby replace the residual reformed gas.

According to this second embodiment, the combustion exhaust gas can fill the various apparatus components quicker than in the foregoing first embodiment because of the diverging flow upstream and downstream from the reformed gas feeding channel 22 provided between the CO remover 2 and water supplier 3.

Figure 4:
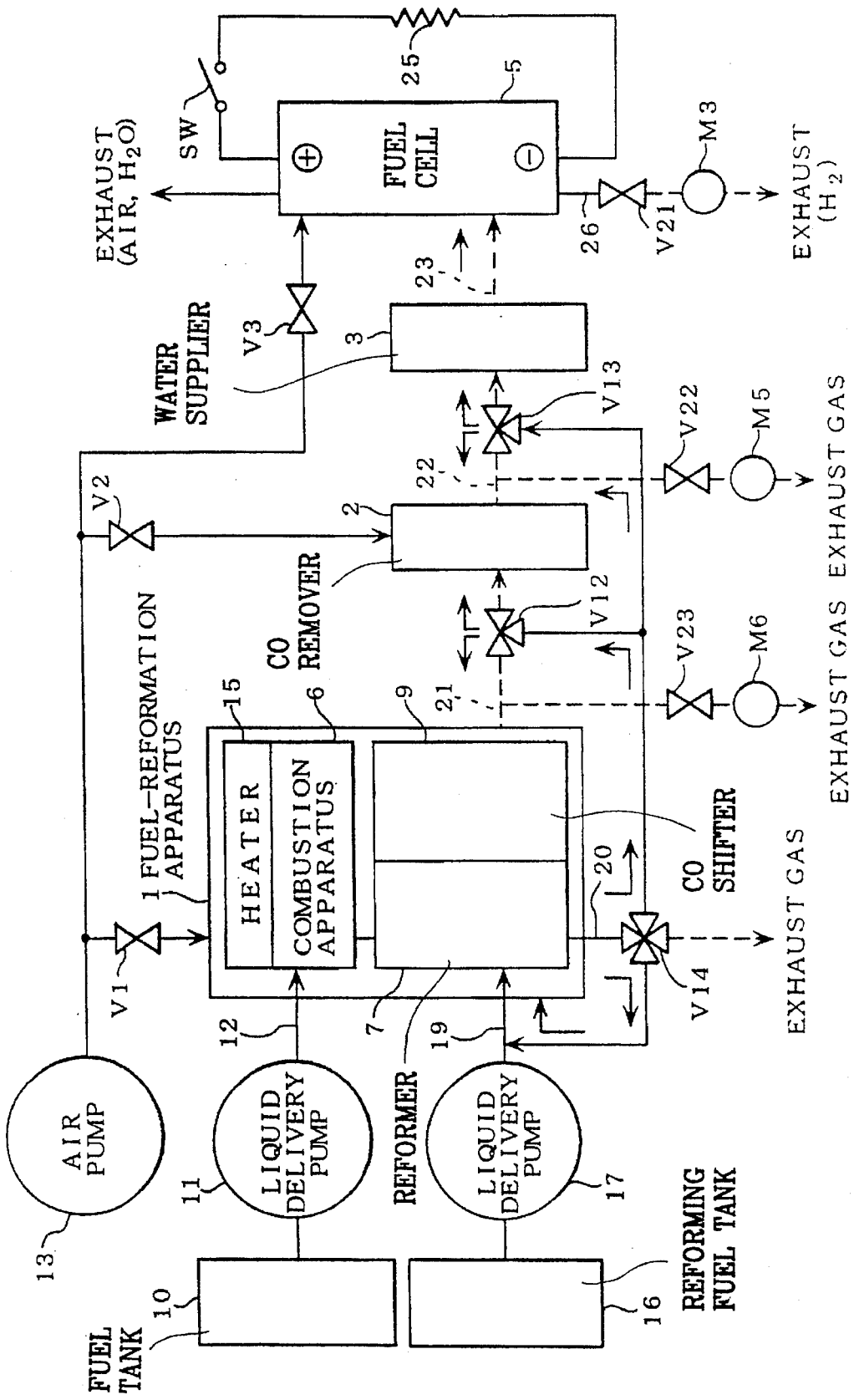
FIG. 4 is a block diagram of a third embodiment of the fuel cell power generation system of the present invention.

As shown in the block diagram of FIG. 4, the third embodiment differs from the second embodiment in that a four-way gas changeover valve V14 replaces the three-way valve V11 in the exhaust-passage 20 extending from the fuel gas generating apparatus 1 and a gas exhaust valve V23 and a flowmeter M6 are provided in the reformed gas feeding channel 21, located between the fuel gas generating apparatus 1 and the CO remover 2. Accordingly, after exhausting the residual reformed gas through three of the gas exhaust valves V21, V22, V23 in the shut down operation, the combustion exhaust gas exiting from the fuel-processing apparatus 1 is returned through gas changeover valve V14, in the exhaust-passage 20, to the reforming fuel feed passage 19 at upstream side of the fuel gas generating apparatus 1 and simultaneously flows through the gas changeover valve 14 and thereafter through two of the gas changeover valves V12, V13, and into the reformed gas feeding channel connecting the fuel gas generating apparatus 1 and the CO remover 2 and into the reformed gas feeding channel 22 connecting the CO remover 2 and the water supplier 3. Consequently, the combustion exhaust gas flows through the reforming fuel feed passage 19, as well as respective reformed gas feeding channels 21 and 22, into the fuel gas generating apparatus 1 and CO remover 2, as well as the reformed gas feeding channel 23 and the inside of the fuel cell 5, to thereby replace the residual reformed gas.

In the above-described third embodiment, the combustion exhaust gas purges more quickly than in the foregoing second embodiment by being introduced through the reforming fuel feed passage 19 as well as into respective feed channels 21 and 22, for flow both upstream and downstream from those points of introduction.

Figure 5:
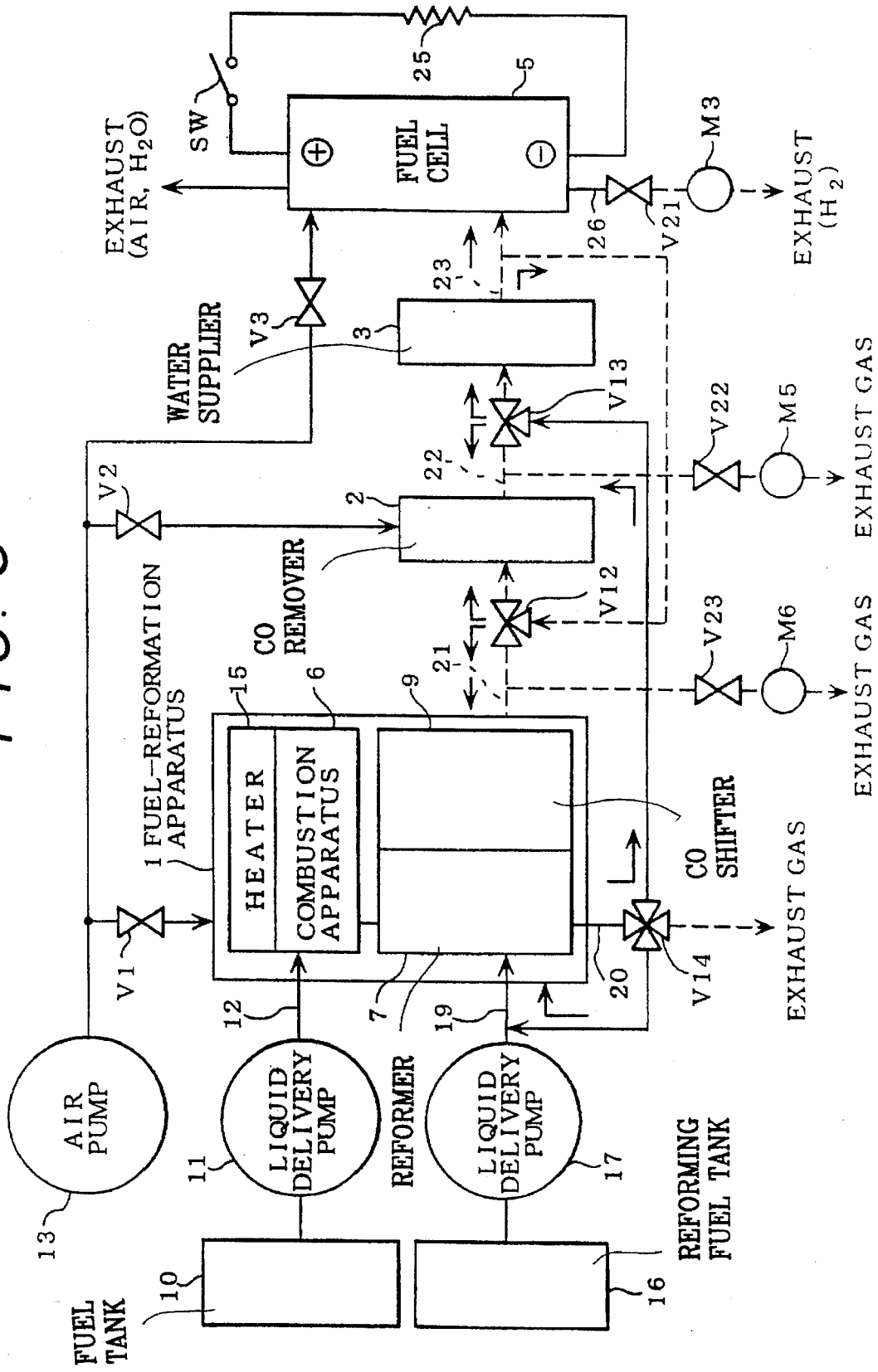
FIG. 5 is a block diagram of a fourth embodiment of the fuel cell power generation system of the present invention.

In the fourth embodiment as shown in FIG. 5, after exhausting the residual reformed gas through three of the gas exhaust valves V21, V22, V23 in the shut down operation, the combustion exhaust gas from the fuel gas generating apparatus 1 is returned through the gas changeover valve 14 in the exhaust passage 20 to be reintroduced into the fuel feed passage 19 at the upstream side of the fuel gas generating apparatus 1 and, differing from the above-described third embodiment, simultaneously through the gas changeover valve V13 into only the reformed gas feeding channel 22 connecting the CO remover 2 and the water supplier 3. The combustion exhaust gas passing through the water supplier 3 flows through the reformed gas feeding channel 23, between the water supplier 3 and the fuel cell 5, into the fuel cell 5 and further through the gas changeover valve V12 into the reformed gas feeding channel 21 between the fuel gas generating apparatus 1 and the CO remover 2, so as to partly flow into the fuel gas generating apparatus 1.

According to this fourth embodiment, as the combustion exhaust gas, humidified by passage through the water supplier 3, flows into the fuel gas generating apparatus 1 and through the fuel feed passage 19, the deposition of carbon on the reforming catalyst can be reduced even if residual methanol remains in the reformer 7.

As can be recognized from the above description, the fuel cell power generation system and operating method of the present invention assure safety at the beginning of the resumption of power generation and prevent the catalysts in the fuel cell and in the fuel gas generating apparatus from being degraded by the residual reformed gas. Further, the utilization of the combustion exhaust gas from the combustion apparatus enables the fuel cell power generation system to be small in size and low in weight, to save time in maintenance and to reduce cost of power generation, since a source of inert gas is not required as in conventional systems.

Accordingly, the present invention is believed to provide a highly advantageous fuel cell power generation system for powering an electric vehicle.

The invention may be embodied in other specific forms without departing from the essence or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A fuel cell power generation system comprising:

combustion means for burning a fuel and thereby generating heat and a combustion exhaust gas;

fuel reforming means for reforming a fuel to produce a hydrogen-rich reformed gas, utilizing said combustion exhaust gas as a heat source;

CO removal means for removing carbon monoxide from the hydrogen-rich reformed gas;

detection means for detecting the presence of residual reformed gas in a gas passage through which reformed gas flows;

a fuel cell for generating electricity by reacting the reformed hydrogen-rich gas and oxygen; and gas purge means for purging said reformed gas, remaining in said system upon stopping said generating of electricity, from at least one vessel selected from the group consisting of said fuel reforming means, said CO removal means and said fuel cell, said gas purge means comprising conduit means for feeding the combustion exhaust gas from said combustion means through said one vessel to displace the reformed gas from said one vessel with the combustion exhaust gas until reformed gas is no longer detected by said detection means.

2. A fuel cell power generation system according to claim 1, wherein said fuel reforming means comprises said one vessel.

3. A fuel cell power generation system according to claim 1, wherein said CO removal means comprises said one vessel.

4. A fuel cell power generation system according to claim 1, wherein said fuel cell comprises said one vessel.

5. A fuel cell power generation system according to claim 1, wherein said fuel reforming means, said CO removal means and said fuel cell are connected in series by first and second gas pipes for flow of the reformed gas therethrough, and wherein said conduit means includes connections with said first and said second gas pipes for introducing the combustion gas at said connections for both upstream and downstream purging.

6. A fuel power generation system according to claim 5 further comprising:

a third gas pipe for supplying exhaust combustion gas from the combustion means to the fuel reforming means;

an exhaust pipe for exhausting the combustion exhaust gas from said fuel reforming means;

a fuel feed line for feeding a fuel to said fuel reforming means; and a gas diversion valve in said exhaust pipe for diverting said combustion exhaust gas into said conduit means or into said fuel feed line for said purging.

7. A fuel power generation system according to claim 6 wherein said connections are three-way valves.

8. A fuel power generation system according to claim 5 wherein said connections are three-way valves.

9. A fuel cell power generation system according to claim 1, further comprising gas humidifying means for cooling and humidifying the reformed gas in passage between said CO removal means and said fuel cell.

10. A fuel cell power generation system according to claim 1, wherein said combustion means comprises a burner for burning a hydrocarbon fuel in air.

11. A fuel cell power generation system according to claim 1, wherein said combustion means contains a catalyst for burning the hydrocarbon fuel by contact with the catalyst.

12. A fuel power generation system according to claim 1 further comprising:

a gas pipe for supplying exhaust combustion gas from the combustion means to the fuel reforming means;

an exhaust pipe for exhausting the combustion exhaust gas from said fuel reforming means;

a fuel feed line for feeding a fuel to said fuel reforming means; and a gas diversion valve in said exhaust pipe for diverting said combustion exhaust gas into said conduit means or into said fuel feed line for said purging.

* * * * *